United States Patent
Burnett et al.

(10) Patent No.: US 6,505,547 B1
(45) Date of Patent: Jan. 14, 2003

(54) REFRIGERATED BREADING AND BATTER TABLE

(75) Inventors: Craig D. Burnett, Prattville, AL (US); Johnny R. Lewis, Prattville, AL (US); William T. McNeal, Prattville, AL (US)

(73) Assignee: Giles Enterprises, Inc., Montgomery, AL (US)

( * ) Notice: Subject to any disclaimer, the term of this patent is extended or adjusted under 35 U.S.C. 154(b) by 0 days.

(21) Appl. No.: 09/924,456

(22) Filed: Aug. 9, 2001

(51) Int. Cl.[7] .............................. A23L 1/00; A23L 1/31
(52) U.S. Cl. ............................. 99/494; 62/63; 62/381; 99/450.1; 99/516; 118/16; 118/18; 118/24
(58) Field of Search .................... 99/494, 348, 516, 99/534–536, 450.1; 118/13, 16, 31, 19, 23, 24, 312, 18, 417, 418; 62/63, 64, 381, 380, 374, 375, 52.1, 376

(56) References Cited

U.S. PATENT DOCUMENTS

| | | | |
|---|---|---|---|
| 3,520,277 A | 7/1970 | Gordon | 118/23 |
| 3,910,227 A | 10/1975 | Reece | 118/29 |
| 4,182,260 A | 1/1980 | Reece | 118/26 |
| 4,210,074 A * | 7/1980 | Laughman | 99/494 X |
| 4,458,586 A | 7/1984 | Reed | 99/494 |
| 4,550,677 A | 11/1985 | Reese et al. | 118/31 |
| 4,862,824 A | 9/1989 | Reece | 118/22 |
| 4,898,664 A | 2/1990 | Reece | 209/235 |
| 4,936,246 A | 6/1990 | Reece | 118/22 |
| 4,952,309 A | 8/1990 | King | 209/235 |
| 5,020,427 A | 6/1991 | Kennefick et al. | 99/494 |
| 5,052,330 A * | 10/1991 | Stacy | 118/16 |
| 5,226,354 A | 7/1993 | Stewart | 99/494 |
| 5,265,525 A | 11/1993 | Stewart | 99/494 |

OTHER PUBLICATIONS

Breader Blender Sifter, AyrKing Corporation, Louisville, KY, Undated.

* cited by examiner

Primary Examiner—Timothy F. Simone
(74) Attorney, Agent, or Firm—Bradley Arant Rose & White, LLP

(57) ABSTRACT

A mobile table for batter dipping and breading food products such as chicken pieces, shrimp, fish pieces and other food products prior to cooking such as by deep frying. The table includes a batter pan and a breading pan oriented adjacent to each other and supported in a table top. A self-contained refrigeration system is provided in a cabinet underneath the table top to cool the batter pan, the breading pan and to chill water in a refrigerated water reservoir to supply prechilled water to the batter pan. The refrigeration system maintains the batter material in the batter pan and breading material in the breading pan at a temperature to retard or substantially reduce bacteria growth.

15 Claims, 11 Drawing Sheets

REFRIGERATED BREADING AND BATTER TABLE

BACKGROUND OF THE INVENTION

1. Field of the Invention

The present invention generally relates to a mobile table structure to facilitate batter dipping and breading food products such as chicken pieces, shrimp, fish pieces and other food products prior to cooking such products as by deep frying. The table structure includes a batter pan and a breading pan oriented adjacent to each other and supported in a table top. A refrigeration system is provided in the interior of a cabinet which underlies and supports the table top to cool the batter pan, the breading pan and to chill water in a refrigerated water reservoir supported within the cabinet which supplies prechilled water to the batter pan to enable the formation of chilled batter in the batter pan. The refrigeration system maintains the batter material and breading material at a lowered temperature, preferably below 42° F., to retard or substantially reduce bacteria growth.

2. Description of the Prior Art

Many food products are coated with batter and breading prior to cooking. The food products are usually dipped into a generally liquid batter and then covered with a breading material by rolling the batter covered food product in the breading material. The coated food product is then cooked such as by deep frying or the like. Efforts have been made to more efficiently coat food products by providing a batter dip pan and a breading pan supported in a table structure at a convenient height to enable food processing personnel to dip food products into the batter and subsequently roll or otherwise apply breading material such as flour or the like to the food products and then manually placing the coated food products in a deep frying cooker.

U.S. Pat. No. 3,910,227 discloses a table-like structure having a batter pan and breading pan for manual batter dipping and breading of food products. In addition, the following U.S. patents disclose structures relating to the application of coating to food products:

U.S. Pat. Nos. 3,520,277 4,862,824 5,020,427 4,182,260 4,898,664 5,226,354 4,458,586 4,936,246 5,265,525 4,550,677 4,952,309

While the above patents disclose related devices, none of them discloses a mobile breading and batter table including a self-contained refrigeration system which includes a cooling coil in a water reservoir to supply prechilled water for forming a chilled batter dip material and maintaining a low temperature of the batter dip material and breading material. Further, none of the prior patents discloses a mobile breading and batter table which includes a cooling coil associated with the batter dip pan and breading pan to reduce the pan temperatures so as to satisfy temperature recommendations or guidelines provided by health departments and the like, in order to retard or materially reduce bacteria growth in food products as they are being coated prior to cooking.

SUMMARY OF THE INVENTION

Cooking food products by deep fat frying is a well known procedure used by cooks at home and at restaurants and is especially efficient in large volume cooking such as used in carry-out restaurants, fast food restaurants and the like. Food products, such as chicken pieces, shrimp, fish pieces, meat products and the like are usually dipped in a generally liquid batter material and then rolled in flour or other breading material prior to placement in a deep fat fryer. The handling of the food products during the batter dipping and breading process exposes the food products to ambient temperatures which can, in some instances, permit the growth of bacteria in the food products. Such bacteria in the food product can result in potential food poisoning of persons consuming the cooked food product. Various government regulatory agencies, such as health departments and the like, frequently recommend temperature guidelines for various food products to be used by the food preparation industry during food preparation. The temperature standards seek to reduce the temperature of the food products to a level which will serve to reduce or retard the growth of bacteria in the food products during the handling procedure.

In order to satisfy the recommendations or guidelines provided by health departments or similar agencies for handling and processing food products, the present invention provides a mobile breading and batter table having a self-contained refrigeration system supported therein. The table includes a generally rectangular table top and a cabinet structure below the top. The bottom of the cabinet is supported preferably at its corners with four conventional type wheels or rollers which allow the table to be moved and positioned where desired. The table includes a pan for receiving batter material and a pan for receiving breading material in order to coat food products placed first in the batter material and then into the breading material. Both pans have a cooling coil on their exterior surfaces positioned within the cabinet underneath the table top. The cooling coils are incorporated as part of the self-contained refrigeration system.

The batter pan is communicated with a prechilled water supply tank which has a cooling coil incorporated therein, also as part of the refrigeration system. This enables the formation of chilled batter material. The refrigeration system maintains desired lower temperatures in the breading and batter materials during the coating procedure. Both pans also include an opening in their bottom wall to permit removal of the material from each pan. The batter pan discharges batter material into a drain line to a floor drain, and the breading pan discharges used breading material into a sifter which separates agglomerated dough balls from the breading material to recover reusable breading material which can be placed back into the breading pan.

An object of the present invention is to provide a mobile table structure for batter dipping and breading food products that incorporates a self-contained refrigeration system including a cooling coil in a water reservoir to supply chilled water for use in preparing a chilled batter dip material. The self-contained refrigeration system also provides a cooling coil associated with the batter dip pan and a cooling coil associated with the breading pan to maintain the temperature of the batter dip and breading at a sufficiently low temperature during the entire batter dipping and breading procedure. The low temperature generated by the refrigeration system within the batter pan and breading pan is sufficiently low to reduce or retard bacteria growth in the batter material and breading material thereby assuring that the batter and breaded cooked food product satisfies all standard guidelines and recommendations regarding temperatures of the food products during the various process steps.

Another object of the present invention is to provide a mobile, self-contained table structure for batter dipping and breading food products in accordance with the preceding object in which the breading pan has a discharge into a removable sifter positioned in the interior of the table below the breading pan. The sifter receives the breading material from the breading pan when the moisture absorbed by the breading material causes some of the breading material to agglomerate to form dough balls thereby materially reducing the efficiency of the breading process. The sifter separates the dough balls from the breading material that is still usable to enable the reusable breading material to be placed back into the breading pan and the dough balls to be discarded.

A further object of the present invention is to provide a batter dipping and breading table for consumable food products such as chicken pieces, shrimp, fish pieces and the like in which a reservoir of prechilled water is communicated with a faucet having a discharge oriented above the batter dip pan to supply prechilled water to the batter dip pan. The prechilled water enables the batter dip to be originally produced at a low temperature when the prechilled water is used to form the batter dip.

Still another object of the present invention is to provide a batter dipping and breading table for food products in accordance with the preceding objects in which a switch operates a pump to supply prechilled water to the faucet for discharge into the batter dip pan. The switch also controls a solenoid valve that prevents inflow of ambient temperature water into the reservoir when the chilled water pump motor is in operation. When the switch for the pump is turned to the "off" position, the solenoid valve opens for refilling the reservoir with water from a water source to a level determined by a float valve in the reservoir.

An additional object of the present invention is to provide a batter and breading table in which the batter dip pan includes a drain which can communicate with a floor drain or the like to enable the batter dip to be discharged from the batter dip pan. Also, a water spray device mounted on top of the table structure and connected to a water supply is utilized to clean the batter dip pan as well as the breading pan and sifter area.

A still further object of the present invention is to provide a food product batter dip and breading table in which the food product pieces to be batter dipped and breaded are supported in a lift tray having handles and supporting structure associated with the batter dip pan to facilitate batter dipping of the food products.

Yet another object of the present invention is to provide a mobile table structure for batter dipping and breading food products prior to cooking that includes a self-contained refrigeration system which supplies prechilled water to use in the formation of the batter dip and directly cools the batter dipping pan and breading pan to maintain the batter dipping material and breading material at a low temperature, preferably below 42° F., to retard or substantially reduce the growth of bacteria in the batter dipping material and breading material.

Yet still another object of this invention is to provide a refrigerated breading and batter table in accordance with the preceding objects which will conform to conventional forms of manufacture, be of simple construction and easy to use so as to provide a structure that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
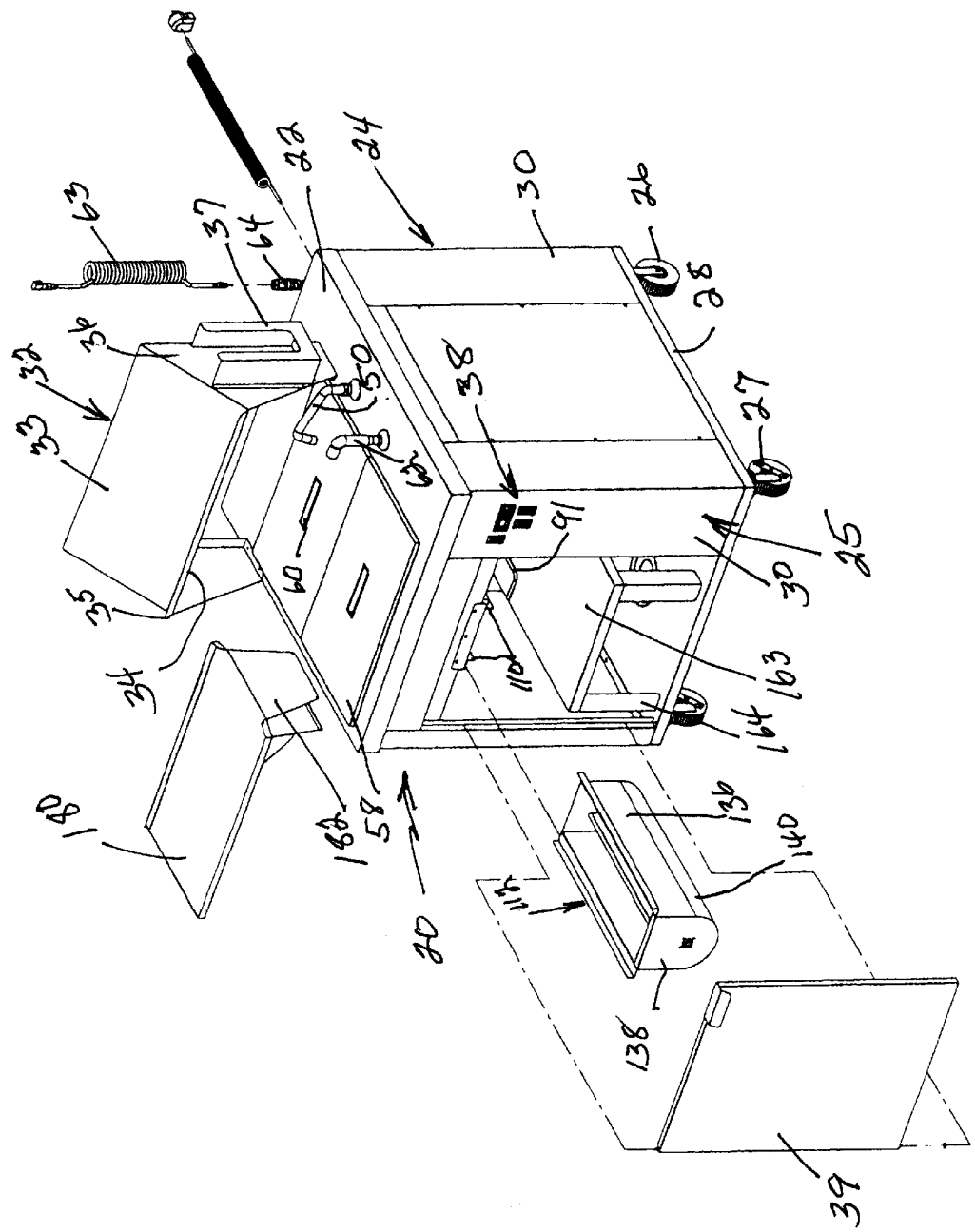
FIG. 1 is an exploded, group front perspective view of a batter dipping and breading table in accordance with the present invention.
Figure 2:
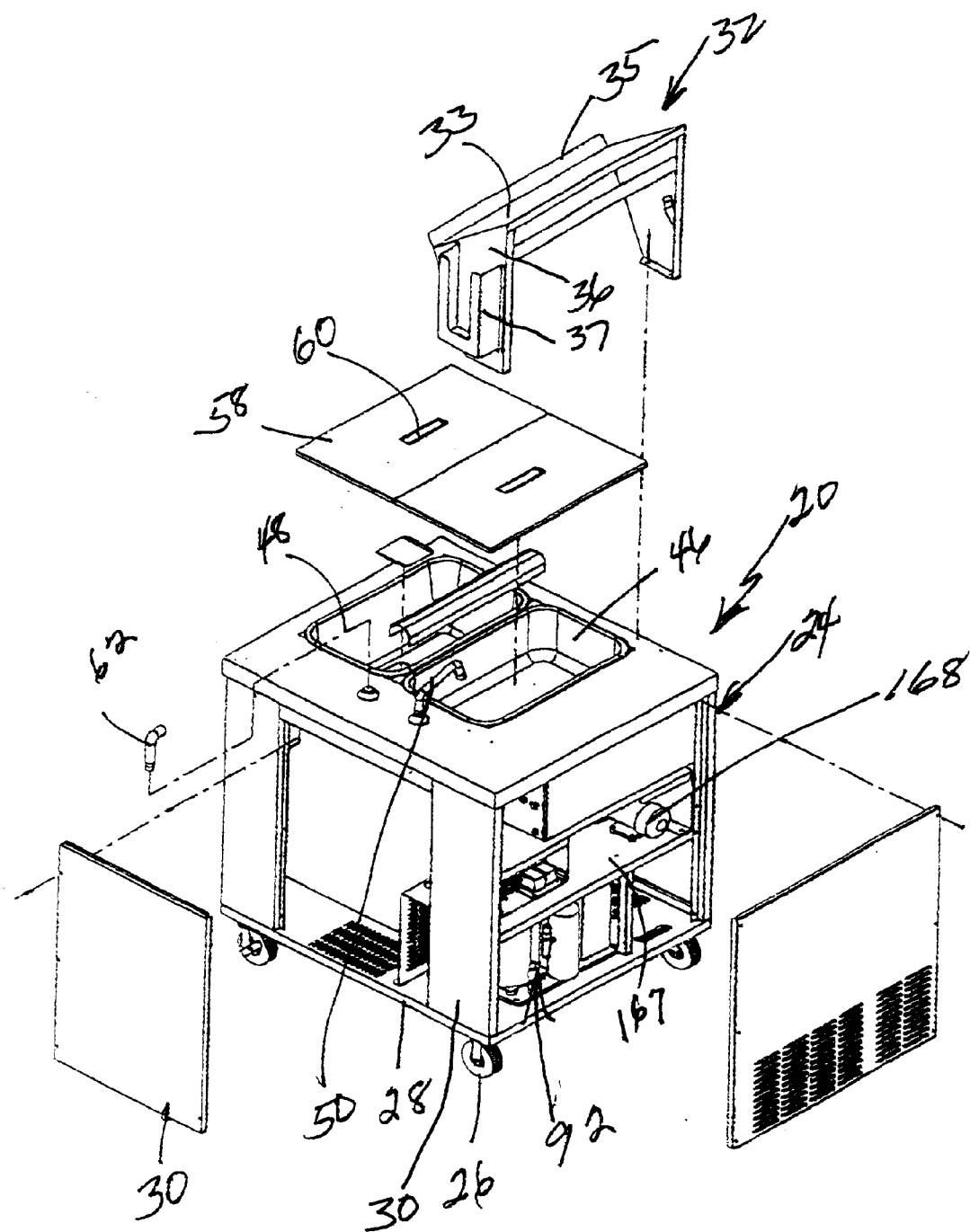
FIG. 2 is an exploded, group rear and side perspective view of the table and cabinet forming the batter dipping and breading table shown in FIG. 1.

Although only one preferred embodiment of the invention is explained in detail, it is to be understood that the embodiment is given by way of illustration only. It is not intended that the invention be limited in its scope to the details of construction and arrangement of components set forth in the following description or illustrated in the drawings. Also, in describing the preferred embodiment, specific terminology will be resorted to for the sake of clarity. It is to be understood that each specific term includes all technical equivalents which operate in a similar manner to accomplish a similar purpose.

The batter dip and breading table for food products in accordance with the present invention is generally designated by reference numeral 20 with the overall configuration and arrangement of components thereof being illustrated in FIGS. 1–5. The table 20 includes a generally horizontal and generally flat table top 22 and a generally rectangular support cabinet 24 extending downwardly from and underneath the table top 22. The cabinet 24 is supported by a plurality of wheels or rollers 26. The support wheels 26 are preferably in the form of caster wheels provided with a suitable brake structure 27 to anchor the table 20 when positioned in a selected location. The support wheels 26 are connected to a bottom member 28 of rectangular configuration with the table top 22 being supported by vertical wall members 30 forming the side and end walls of the cabinet 24.

The rearward end of the table top 22 is preferably provided with an upstanding hood, generally designated by reference numeral 32, which has a forwardly facing, open area 34. The hood 32 includes a slanted top wall 33 having an upturned flange 35 at its lower, forward edge. The flange 35 enables the top wall 33 to support a tray or pan of cooled, uncooked and uncoated food products to be coated in a convenient accessible position. The side wall 36 of the hood 32 preferably includes a slotted, upwardly opening holder and dispenser 37 for storing and dispensing disposable gloves used by personnel when handling the food products. The front end 25 of the cabinet 24 remote from the hood 32 is provided with a control panel, generally designated by reference numeral 38, and an openable or removable door 39 which provides access to the front interior of the cabinet 24. Preferably, the control panel 38 includes a power switch, a chilled water pump switch, a sifter motor switch and a chilled water temperature indicator.

Figure 7:
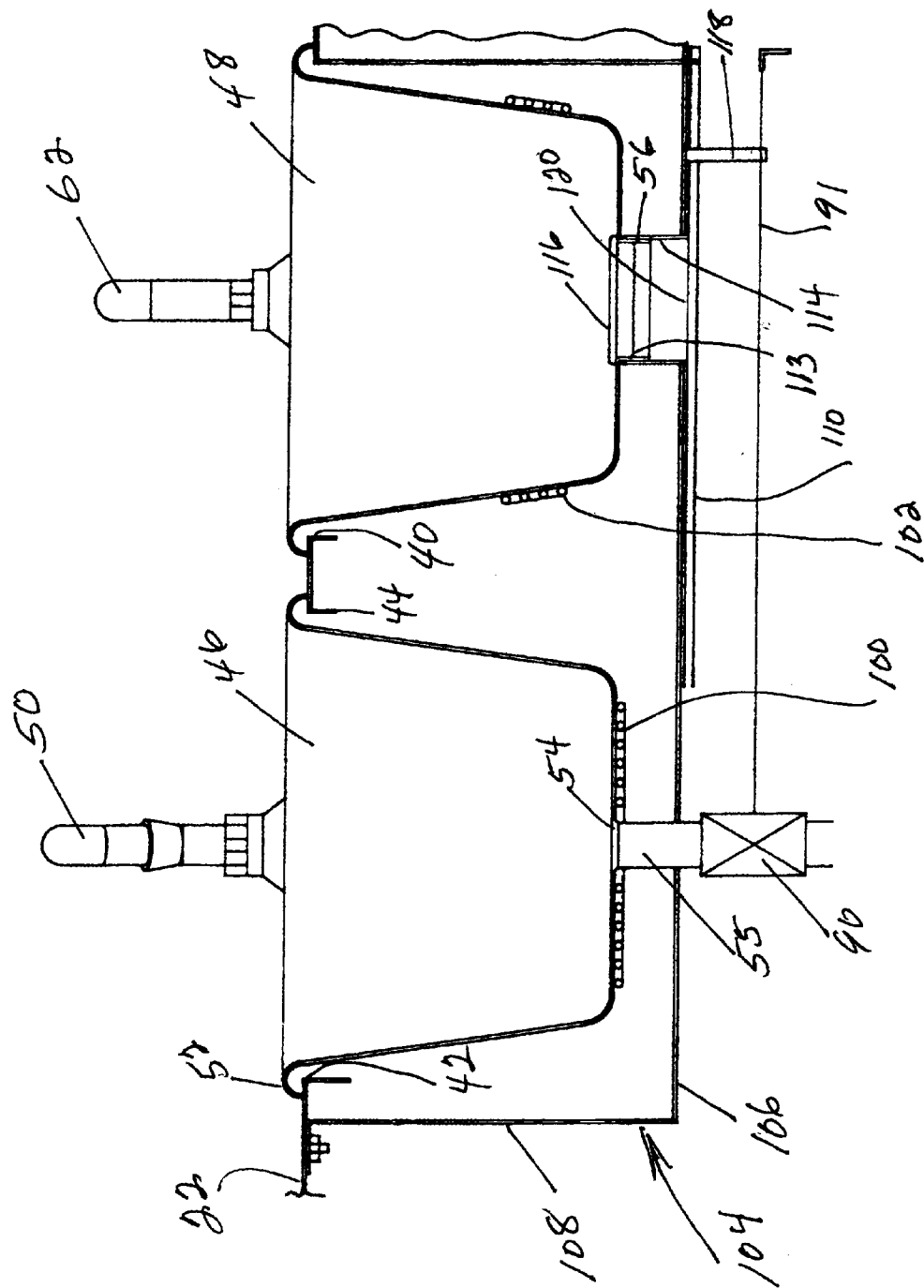
FIG. 7 is a sectional view of the table top, batter dip pan, breading pan and the enclosure pan below the table top in accordance with the present invention.
Figure 8:
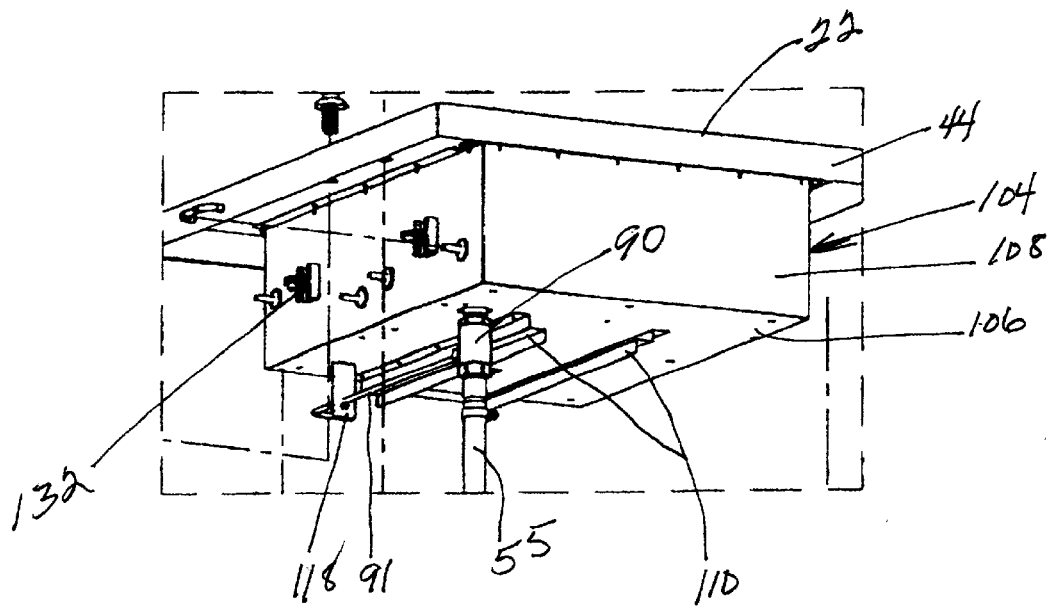
FIG. 8 is a bottom perspective view of the enclosure pan underlying the batter dip and breading pans in accordance with the present invention.

As shown in FIG. 7, the table top 22 includes a pair of generally rectangular openings 40 and 42 which are oriented adjacent to each other. The periphery of each of the openings 40 and 42 is defined by a down turned reinforcing edge flange 44. The opening 42 adjacent hood 32 receives a batter dip pan 46, and the opening 40 remote from the hood receives a breading pan 48. The table top 22 also includes a swivel faucet 50 mounted thereon which extends from a side of the table top 22 into overlying relation with a side portion of the opening 42 in order to discharge refrigerated water into the batter dip pan 46. The pans 46 and 48 each includes a rolled peripheral flange 52 for reinforcement and engagement with the table top 22 around the periphery of openings 40 and 42, respectively.

The bottom of batter pan 46 includes a drain opening and fitting 54 connected to a drain pipe 55, and the bottom of breading pan 48 includes an enlarged discharge opening 56. Each of the pans 46 and 48 includes a cover 58 including a handle 60 to enable removal and placement of the covers. In addition to the faucet 50 which supplies chilled water to the batter pan 46, the table top 22 includes a spray nozzle 62 having a flexible hose or other tubing connection with an inlet fitting 64 in the rear end wall of the cabinet 24. The inlet fitting 64 is preferably a standard male hose fitting so that a standard hose 63 can be attached to supply a pressurized source of water to the spray nozzle 62 and to a refrigerated water reservoir 98 as described hereinafter.

Figure 10:
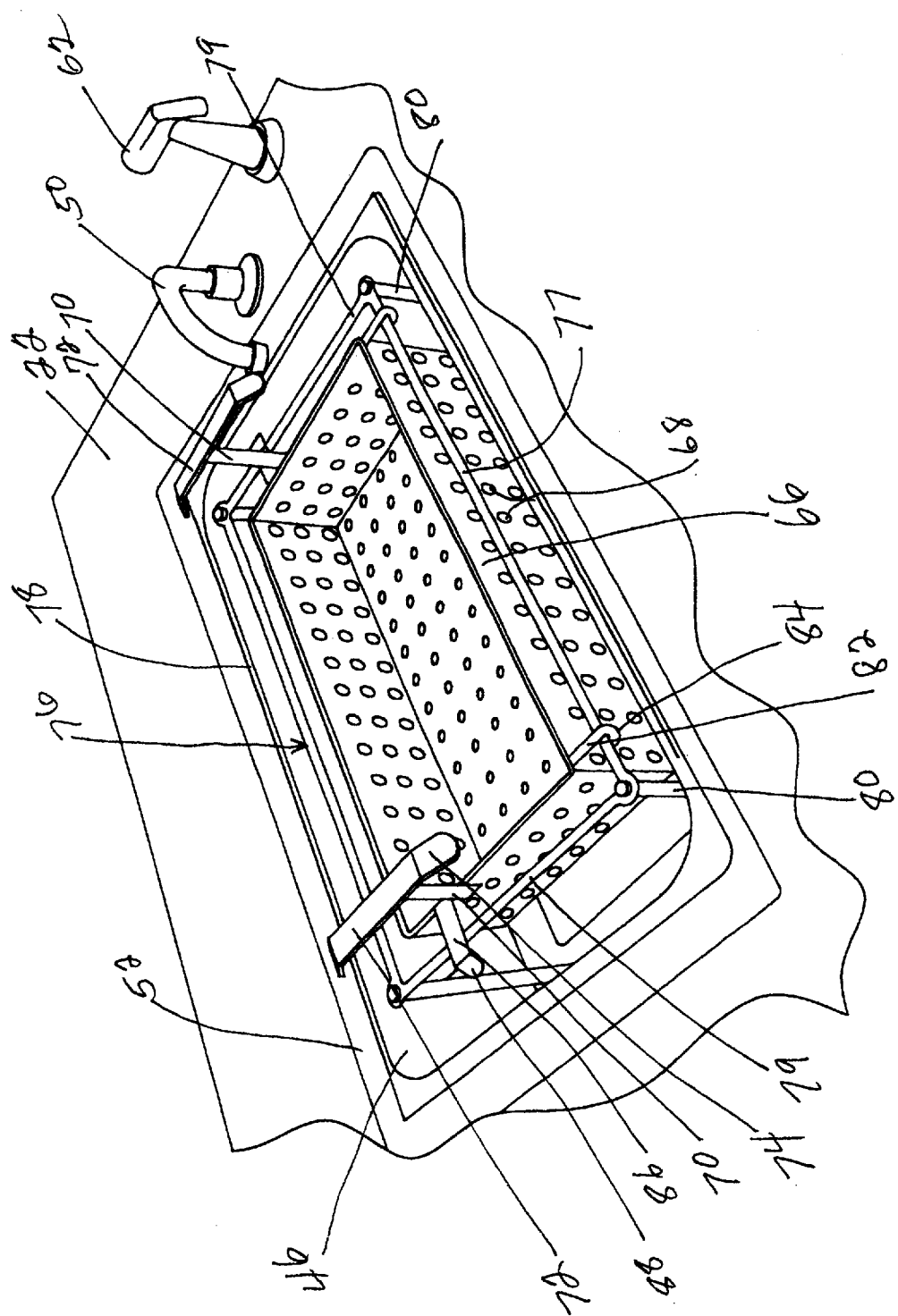
FIG. 10 is an enlarged perspective view illustrating the association of the batter pan, the food product tray, the chilled water faucet to discharge prechilled water into the batter pan and a water spray nozzle connected to a source of water for cleaning components in accordance with the present invention.

As illustrated in FIG. 10, the batter pan 46 with which the faucet 50 is aligned is provided with a removable tray or basket 66 having apertures 68 throughout the side and bottom walls. Opposite ends of the basket 66 are each provided with an upstanding support member 70 offset to one side thereof which terminates in a horizontally extending handle 72 preferably having down turned end portions 74 which enable the basket 66 to be more easily lifted and handled. A supporting stand generally designated by reference numeral 76 is provided in the pan 46 and includes a rectangular peripheral rod member 78 and depending support corner legs 80. One side of the basket 66 is provided with projecting wire members 82 having inwardly facing hook-shaped ends 84 to pivotally engage side rods 77 of peripheral rod member 78 in a manner which enables the basket 66 to be pivoted in relation to the stand 76. The portion of the basket 66 opposite to wire members 82 is supported from ends 79 of peripheral rod member 78 by laterally extending support members 86 having down turned outer ends 88 to engage the end rods of the peripheral rod member 78. The corner legs 80 of stand 76 are resiliently telescopic to enable the basket 66 to be depressed into the batter pan 46. This structure enables the food product pieces, such as chicken parts, placed in tray 66 to be depressed with the basket 66 into the batter pan 46 in order to immerse the pieces in the batter material. Then the basket 66, after returning to the original position, can be pivoted in relation to the supporting stand 76 and the batter pan 46 as hook shaped ends 82 pivot on side rod 77 of stand 76 to dump the food product pieces into the adjacent breading pan 48.

Figure 5:
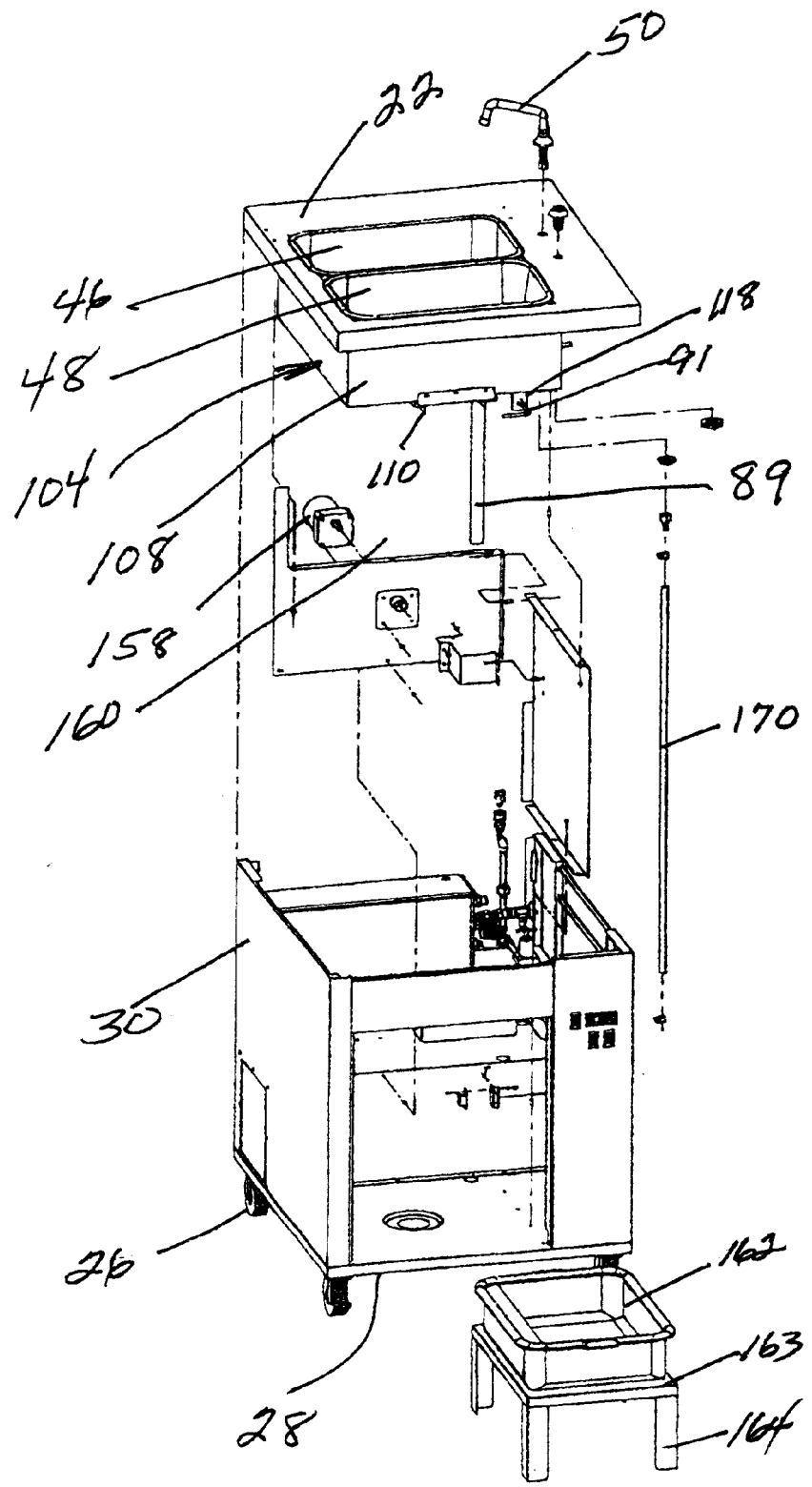
FIG. 5 is a vertically exploded, group front perspective view of the table and cabinet forming the batter dipping and breading table in accordance with the present invention.
Figure 6:
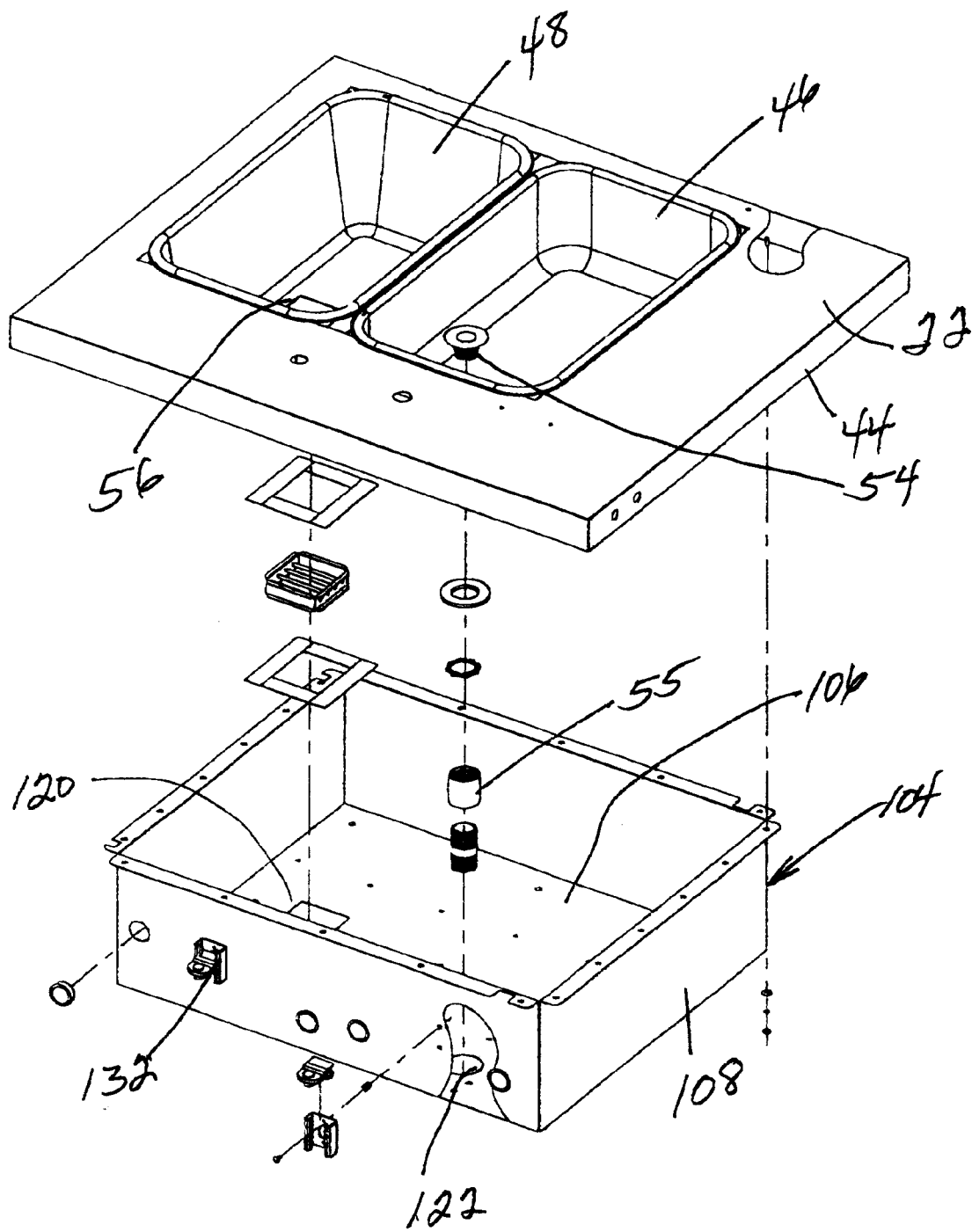
FIG. 6 is an exploded, group rear perspective view of the table top, breading and batter pans and the enclosure pan underlying the breading and batter pans in accordance with the present invention.

The drain pipe 55 has a conventional valve 90, and the batter pan 46 can be drained through the drain pipe 55 when valve 90 is opened. The outlet of the drain pipe 55 is provided with a drain hose 89 or the like, as shown in FIG. 5, which exits from the cabinet to communicate with an available floor drain, thus enabling the batter material in the batter pan 46 to be drained and discarded. An actuator rod 91 (see FIGS. 1 and 5) to open and close valve 90 extends to the forward end of cabinet 24 for access through the door opening when door 39 is open. The spray device 62 can be used to clean the interior of the batter pan 46 as well as the breading pan 48 to enable subsequent replenishment of the batter dip and breading in the pans 46 and 48.

Figure 11:
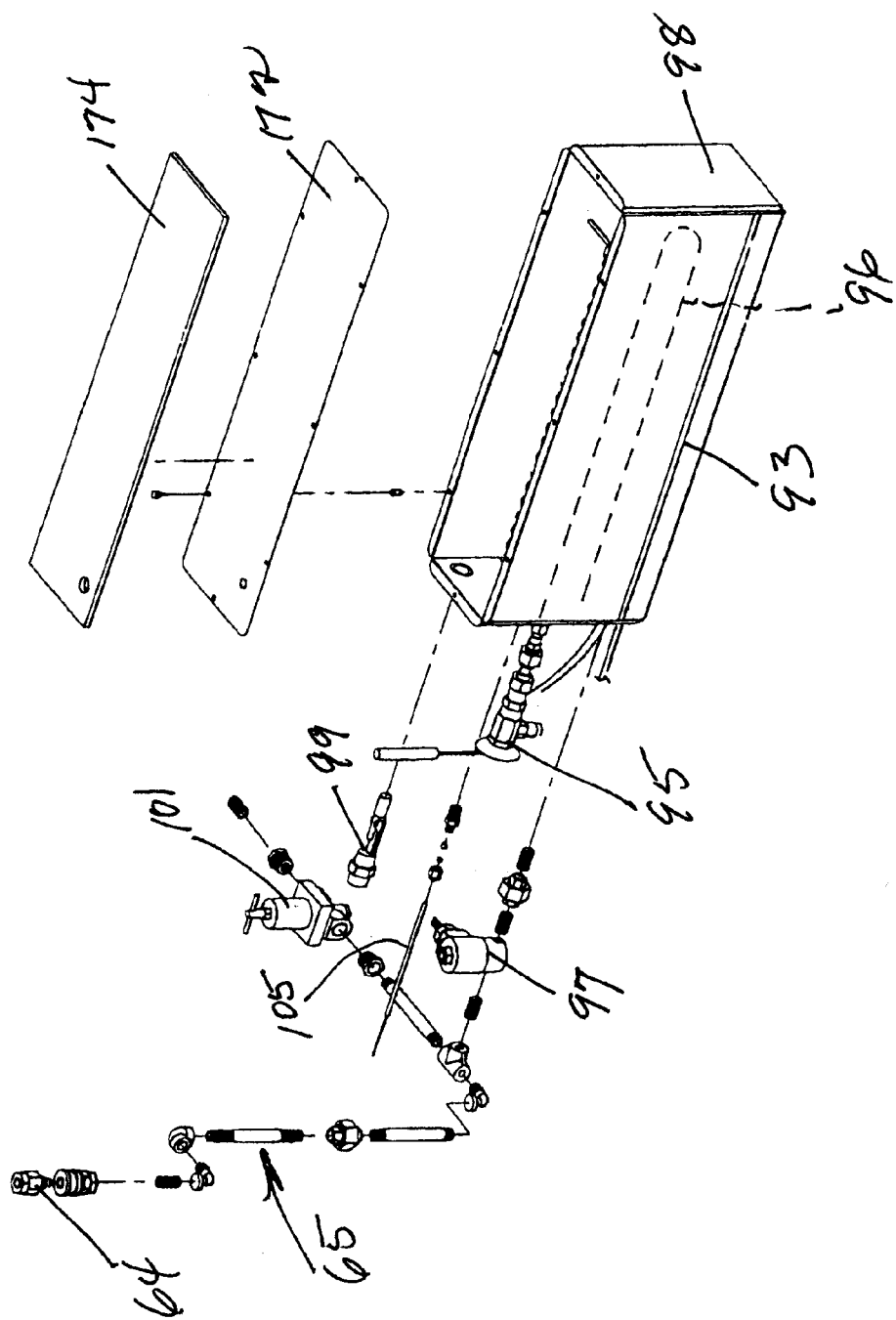
FIG. 11 is an exploded, group perspective view of the chilled water reservoir and associated components in accordance with the present invention and related controls.

As illustrated in FIGS. 2–5, the breading and batter table 20 of the present invention includes a self-contained refrigeration system generally designed by reference numeral 92 supported on a support plate 94 mounted at the rear of bottom member 28 of the cabinet 24. The refrigeration system 92 includes the usual refrigerant compressor, condenser, evaporator air circulating fan for the condenser, receiver for condensed refrigerant and appropriate adjustable controls to provide the operating parameters for the refrigeration system. As shown in FIG. 11, the refrigeration system 92 also includes an evaporator cooling coil 96 which is received in the chilled water reservoir 98 located below the hood end of table top 22 (see FIG. 3). The cooling coil 96 in the chilled water reservoir 98 receives refrigerant through an expansion valve 95 and forms an evaporator in the refrigeration system. As the refrigerant exits evaporator coil 96 it passes to the cooling coil 100 on batter pan 46 and then to the cooling coil 102 on breading pan 48. The water in the reservoir 98 is maintained at a predetermined low temperature, preferably below 42° F. The water in the reservoir 98 may be replenished through the hose connection 64, a solenoid water inlet valve 97 and a suitable float valve 99 (see FIG. 11) in the reservoir to maintain a predetermined water level in the reservoir 98. A water pressure regulating valve 101 controls water pressure in the water system.

As shown in FIG. 7, the batter pan 46 is provided with an external evaporator cooling coil 100 in heat exchange relation, and preferably attached to the bottom surface thereof. The cooling coil 100 is attached in a spiral or concentric loops on the exterior bottom surface of the batter pan 46 in order to maintain the temperature of the batter in the batter pan at a low temperature, preferably below 42° F., sufficient to retard or substantially reduce bacteria growth in the batter dip. The breading pan 48 also includes an evaporator cooling coil 102 attached in a heat exchange relation to the exterior of the pan in a spiral or concentric loop configuration. The cooling coil 102 is preferably attached around a portion of the pan side walls, instead of attaching to the bottom surface as coil 100 is attached for the batter pan 46. The cooling coils 100 and 102 receive expanding refrigerant, in series, from a tube connected with the discharge end of cooling coil 96 in reservoir 98. Expanded refrigerant which exits from coils 100 and 102 returns to the compressor of the refrigeration system 92 through tubing in a conventional manner.

As illustrated in FIGS. 5–9, an enclosure pan 104 underlies and is attached to the table top 22 and encloses the portions of the batter pan 46 and breading pan 48 which depend from the table top 22. The enclosure pan 104 includes a bottom wall 106 generally parallel to the table top 22 and peripheral side walls 108 connected to the underneath side of table top 22. The pan 104 thus encloses the pans 46 and 48 and isolates the pans 46 and 48, and their respective cooling coils 100 and 102, from the remaining interior of the cabinet 24. The pan 104 is preferably insulated with urethane foam to insulate pans 46 and 48 as well as cooling coils 100 and 102, respectively. This arrangement thereby enables the expanding refrigerant in the cooling coils 100 and 102 to more efficiently cool the batter and breading pans 46 and 48 and thus maintain low temperature conditions in the batter dip material and the breading material contained therein.

The bottom surface of the bottom wall 106 of enclosure pan 104 includes longitudinal tracks 110 mounted thereon in spaced parallel relation. The tracks 110 are oriented with one end edge adjacent the openable door 39 to slidably and removably support a sifter pan generally designated by reference numeral 112. The sifter pan 112, when installed, is positioned in underlying relation to discharge opening 56 in the breading pan 48. A connecting extension 113 extends from the discharge opening 56 into connecting sleeve 114 in the bottom wall 106 for discharging the breading material including any dough balls that may exist into the sifter pan 112 when a closure plug 116 for the opening 56 is removed. Also, the bottom wall 106 includes a depending supporting it bracket 118 (see FIGS. 5 and 8) for the actuating rod 91 for the discharge valve 90 that is communicated with the batter pan 46. The actuator 91 preferably includes an angled end portion oriented adjacent the openable door 39 to enable the valve 90 to be opened and closed from the front end of the cabinet 24.

Figure 9:
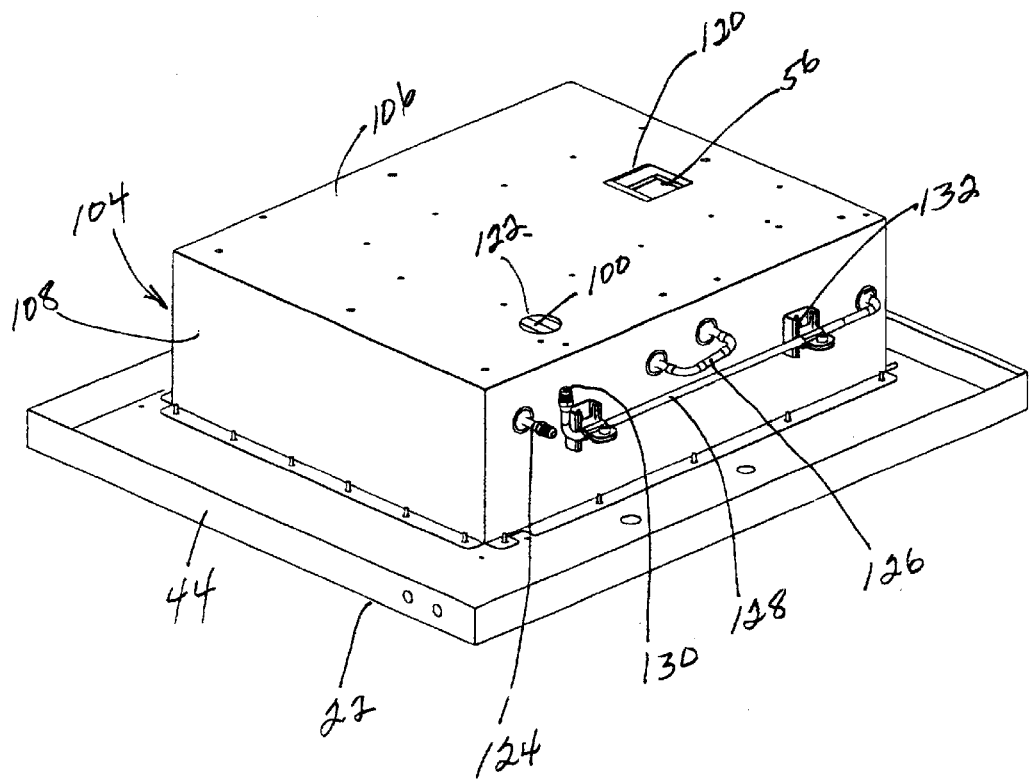
FIG. 9 is a perspective view of an inverted table top and enclosure pan which underlies the batter and breading pans in accordance with the present invention.

FIG. 9 illustrates the relationship of the enclosure pan 104 to the underside of the table top 22. The bottom wall 106 has an opening 120 which aligns with the sifter pan 112 when it is supported from tracks 110 in underlying relation to the enclosure pan 104. Likewise, the bottom wall 106 includes an opening 122 through which the discharge pipe 55 from the batter pan passes. As shown in FIG. 9, the discharge opening 56 in the breading pan 48 is visible through the opening 120 and the cooling coil 100 on the bottom surface of the batter pan 46 is visible through the opening 122. Also illustrated in FIG. 9 is tubing for circulation of refrigerant through the evaporator cooling coils 100 and 102 including a fitting 124 communicated with cooling coil 100 and a short connective tubing 126 connecting coil 100 with coil 102. An elongated tubular member 128 extends from cooling coil 102 back to a fitting 130 which is adjacent the fitting 124 so that refrigerant can enter and exit the fittings 124 and 130 which are adjacent each other and through the coils 100 and 102 in sequence. The tubing 128 and the fitting 130 on the end thereof are preferably supported by a pair of brackets 132 on a side wall 108 of the enclosure pan 104. It is noted that in FIG. 9, the tracks 110 for the sifter pan 112 and the bracket 118 for the valve actuator 91 have been omitted for clarity.

Figure 12:
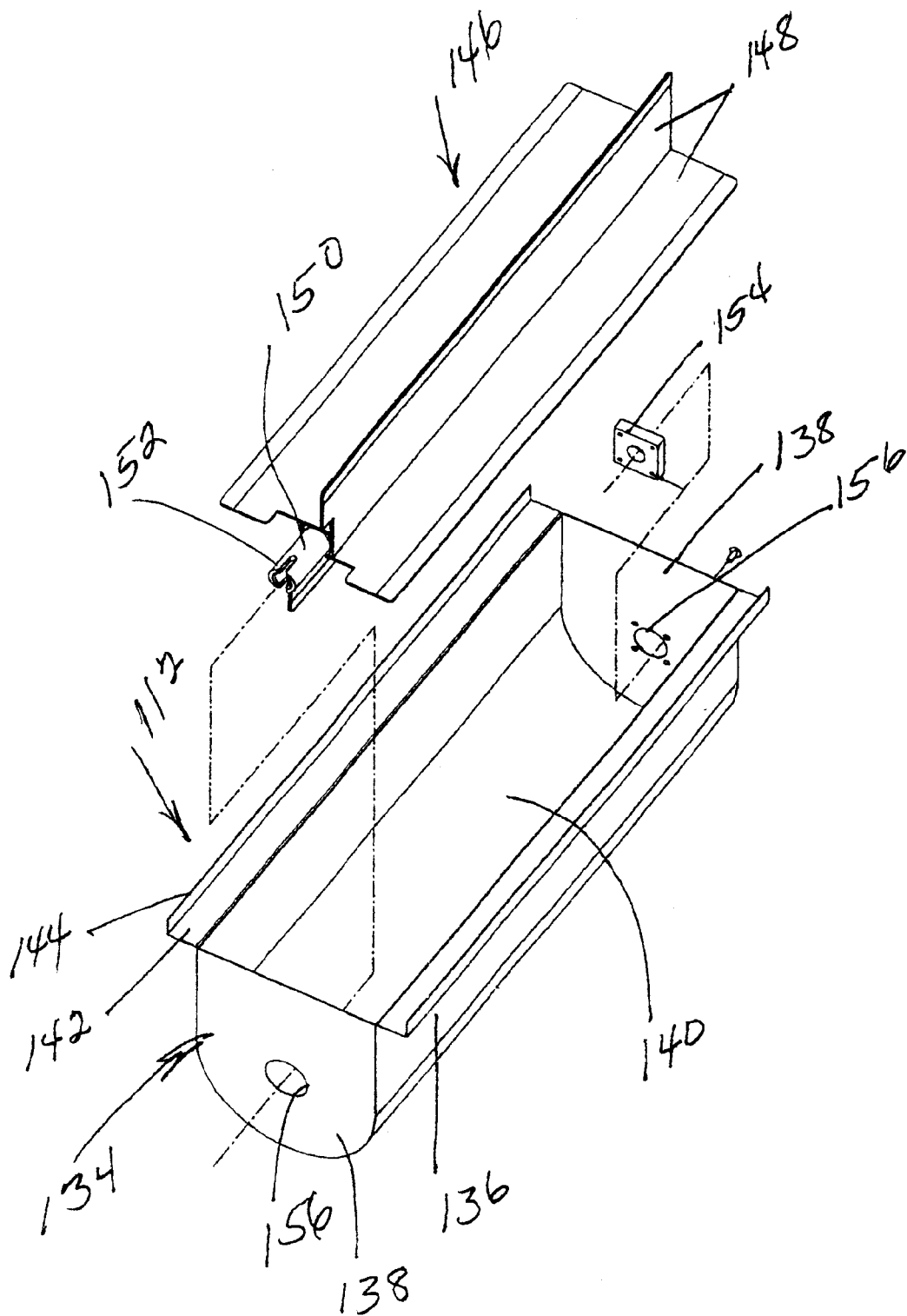
FIG. 12 is an exploded group perspective view of the sifter which underlies and is supported by the enclosure pan to receive breading material from the breading pan in accordance with the present invention.

As shown in FIG. 12, the sifter pan 112 includes an elongate container 134 including vertical side walls 136, vertical end walls 138 and a bottom screen section 140 of semi-cylindrical configuration interconnecting the walls 136 and 138. The upper edges of the walls 136 each have an outwardly extending flange 142 terminating in an upwardly extending flange 144 which slidably engage and are supported from the tracks 110 on the bottom of the enclosure pan 104. Oriented in the container 134 is an agitator, generally designated by reference numeral 146, which includes a plurality of perpendicularly arranged blades 148 secured to each other and secured tangentially to a central tubular shaft 150 which extends beyond the paddles 148. A drive end of the tubular shaft 150 includes inwardly extending notches 152 which are exposed beyond one end wall 138 when assembled in the container 134. The ends of shaft 150 are each supported by bearing members 154 associated with openings 156 in each end wall 138. When the sifter pan 112 is inserted into the interior of the cabinet 24 by opening the door 39 and sliding the flanges 142 and 144 into engagement with the tracks 110, the notched end 152 of the tubular shaft 150 will drivingly connect with the output shaft of a sifter motor 158 mounted on a partition wall 160 in the interior of the cabinet (see FIG. 4).

Positioned under the sifter pan 112 is an open topped collecting pan 162 supported on a table 163 having depending legs 164 which are positioned interiorly of the cabinet 24 through the open door 39 with the legs 164 supported on the bottom member 28 of the cabinet 24. The sifter motor 158 is activated by a switch at the control panel 38 and is activated after a quantity of food products have been coated in the breading material and the breading material has absorbed some moisture from the food products and agglomerated to form dough balls in the breading material, all of which is deposited in the sifter pan 112 when plug 116 is removed. Use of the sifter enables the dough balls to be separated from the reusable breading material, generally flour, with the breading material that is reusable being deposited into the collecting pan 162 and the dough balls being retained in the container 134. This enables the reusable breading material to be returned back into the breading pan 48 from the collecting pan 162 and the dough balls discarded by removing the sifter pan 112 and dumping the dough balls into a container or the like for disposal.

As an alternative to a motor driven agitator 146 in the sifter pan 112, the agitator shaft may extend through end wall 138 adjacent door 39 and have a hand crank connected thereto for manual operation of the agitator. The hand crank can be detachably connected to the agitator drive shaft and stored in sifter pan 112 when the sifter pan is not in use.

The flexible hose 89 (see FIG. 5) is connected to the discharge pipe 55 from the batter pan 46 to enable the batter material in the batter pan 46 to be discharged into a floor drain when the valve 90 is opened by actuating the valve actuator 91 which is also accessible when the door 39 is opened. The drain hose 89 can be permanently attached to pipe 55 and positioned alongside the sifter pan 112 and collector pan 162 or the drain hose can be removed after the batter pan has been emptied and cleaned by using the spray nozzle 62, if necessary or desirable to eliminate interference of the drain hose with the sifter pan 112, collection pan 162 and/or support table 163 when those components are inserted into the interior of the cabinet 24.

Figure 3:
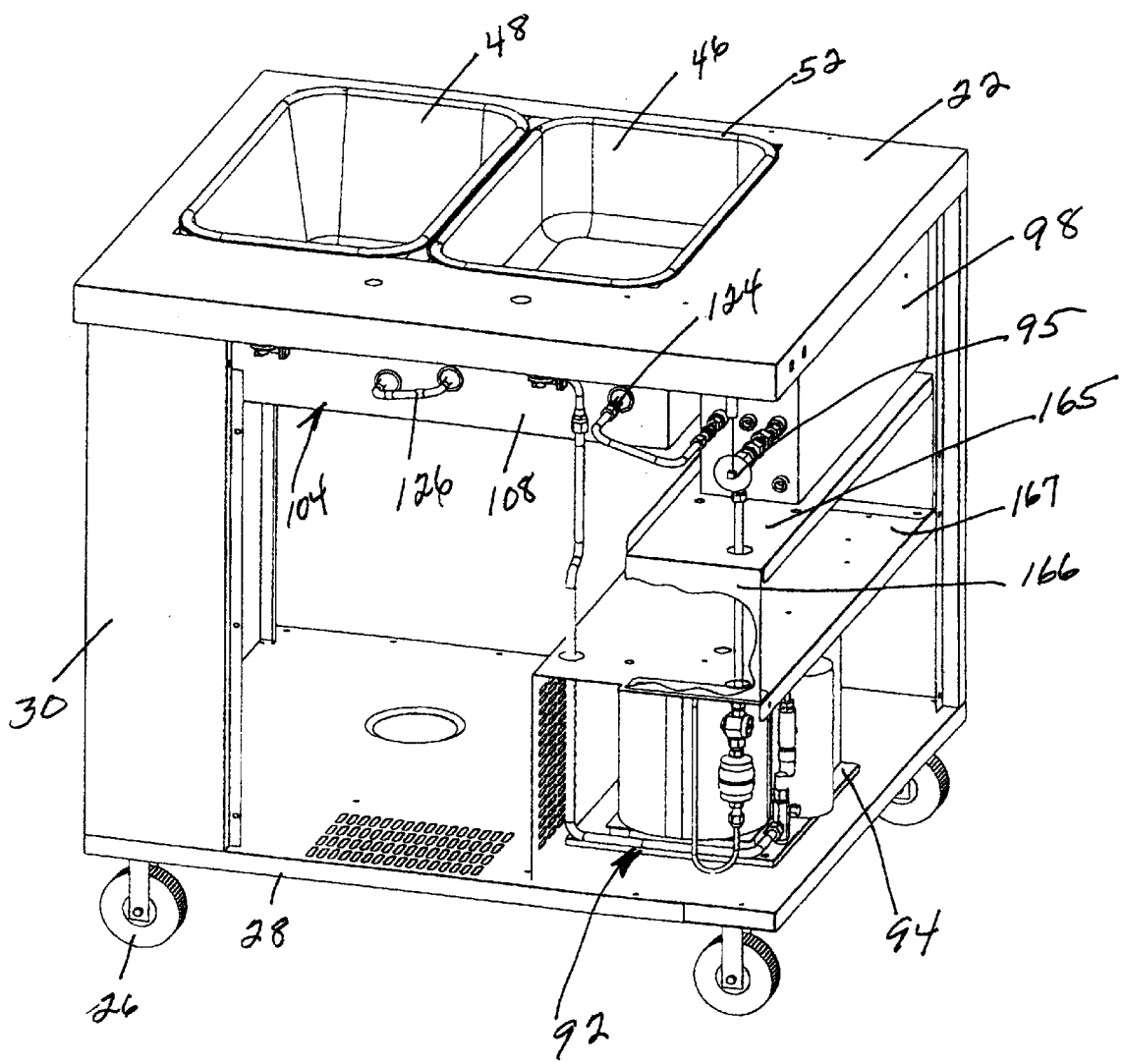
FIG. 3 is a view similar to FIG. 2 with certain components inside the cabinet removed to illustrate details of the refrigeration system.
Figure 4:
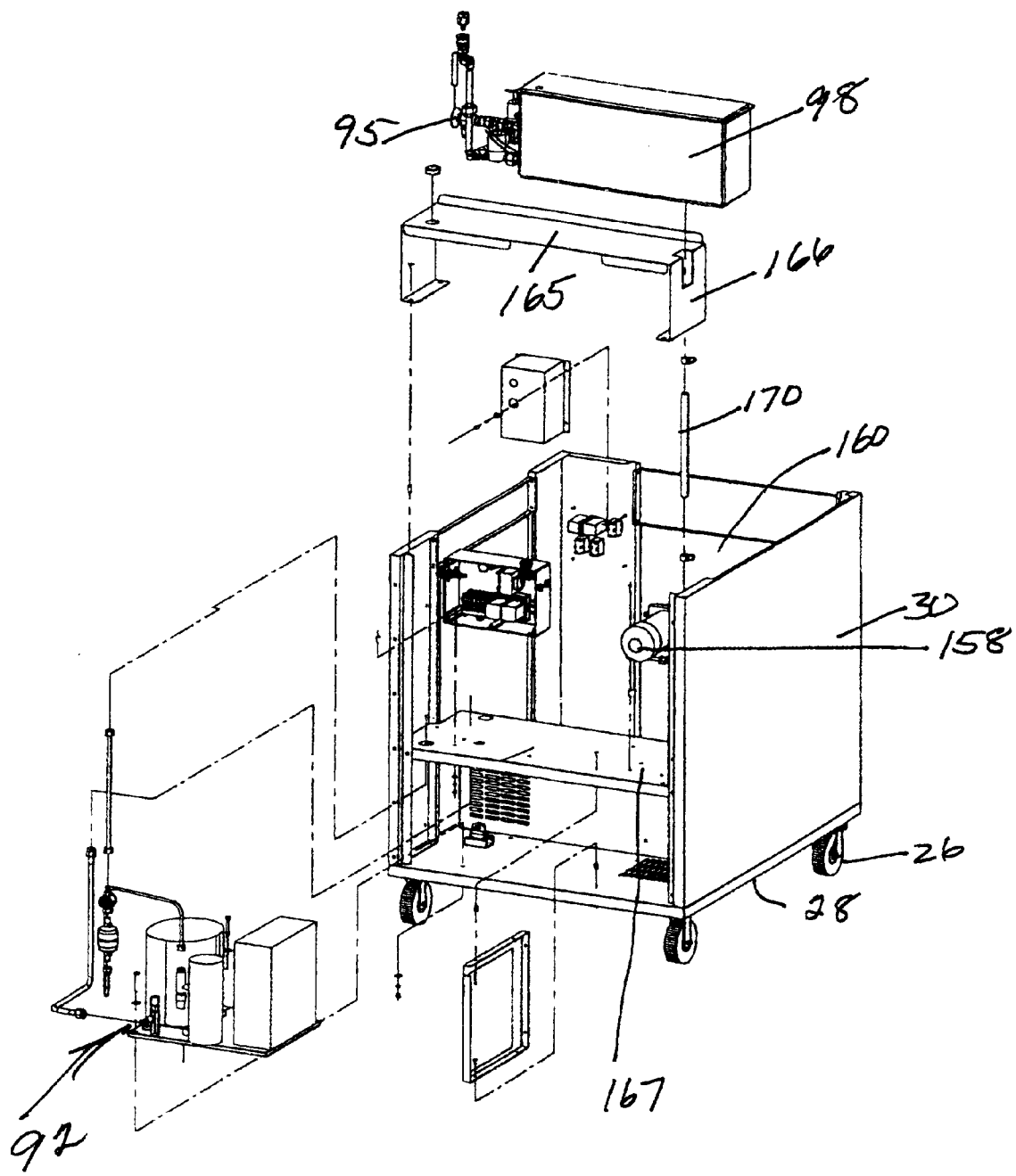
FIG. 4 is an exploded, group rear perspective view of the cabinet and refrigeration system in accordance with the present invention illustrating the components of the refrigeration system and chilled water reservoir.

As illustrated in FIGS. 3 and 4, the water reservoir 98 is supported on a horizontal support shelf 165 having downwardly extending ends 166 which are supported from a horizontal partition wall 167 in the cabinet 24. The horizontal partition wall 167 is disposed above the refrigeration system 92 which is supported on the bottom member 28 below the horizontal partition 167. Water from the water supply source 63 and 64 is supplied to the water reservoir 98 through ¼" pipes and fittings 65 (see FIG. 11) connected to the solenoid valve 97 and then into water reservoir 98.

As shown in FIG. 11, the water reservoir 98 includes a closure top 172 and an insulating cover 174 to form a complete enclosure for the water in the reservoir 98. A water pump 168 pumps water from reservoir 98 to faucet 50. A separate switch at the control panel 38 is used to activate the water pump 168 and the solenoid inlet valve 97 to permit and stop water flow from the water reservoir 98 into the batter dip pan 46.

Operation of the refrigeration system provides liquid refrigerant to the expansion valve, through the cooling coil 96 in the water reservoir 98 and sequentially through the cooling coil 100 on the batter pan 46 and cooling coil 102 on the breading pan 48. The chilled water reservoir 98 includes a temperature probe 103 to indicate water temperature at the control panel 38. A temperature controlled strip heater 93 can be mounted on the outer surface of reservoir 98 to elevate the water temperature to a level to keep the refrigerating system operative for continuous flow of refrigerant to coils 100 and 102 in order to maintain the desired lower temperatures in the pans 46 and 48. The expanded "hot" refrigerant returns to the refrigerant compressor and condenser in a well known manner. Water is supplied to the reservoir 98 through pressure regulator 101 to a level determined by the float valve 99 and cooled by the cooling coil 96. A predetermined quantity of chilled water is supplied to the batter pan through pump 168, pipe 170 and faucet 50 to form a quantity of chilled batter dip in the batter pan. When pump 168 is activated, the solenoid valve is closed. When pump 168 is stopped, the solenoid valve reopens.

When using the breading and batter table of the present invention, an operator can employ the following procedure. The water reservoir is filled and the self-contained refrigerant system operated for a sufficient time to cool the water and pans 46 and 48 to the desired temperatures. A tray containing the food product pieces to be breaded can be placed on top wall 33 against flange 35. The operator then stands at the front of the table facing wall 33 to remove the covers 58.

After the covers are removed and batter dip and breading materials are in the pans 46 and 48, the operator can transfer the food product pieces along with the basket 66 into batter pan 46. The food product pieces in the basket 66 are then immersed in the batter in the batter pan 46 by pushing the basket 66 and depressing rod member 78 to immerse the food products into the batter dip material. The basket 66 then returns to a position above the batter dip material in the pan 46 with excess batter material dripping from the food product pieces back into the batter pan. The batter dipped food product pieces are then deposited into the breading pan 48 by pivoting the basket 66 to a position to dump the food product pieces into the breading pan. The food product pieces in the breading pan are then breaded by rolling the food product pieces or manually applying breading material to the food product pieces. The breaded food product pieces can then be removed from the breading pan 48 and placed in a container positioned on a support shelf 180 supported on the side of the table top 22 opposite the spray nozzle 62 by depending brackets 182 which sit down inside breading pan 48 to facilitate transport of the coated food product pieces to a location for cooking.

After a predetermined quantity of food product pieces have been battered and breaded, the residual batter dip material in the batter pan may be discharged through pipe 55 connected to the discharge fitting 54 and the flexible hose 89 connected to drain pipe 55 and communicated with a floor drain or the like, and the valve 90 is opened. Once the batter dip material has been drained and the batter dip pan cleaned by using the nozzle 62, the valve 90 can be closed and the hose removed if it obstructs insertion of the sifter pan 112, collector pan 162 and/or table support 163 into the interior of the cabinet 24. After insertion of the sifter pan 112 and pan 163, the plug 116 closing the opening 56 in the breading pan 48 is removed for discharge of the breading material into the sifter pan 112 and the sifter motor 158 actuated. Reusable breading material passes through screen 140 into the pan 163 with any dough balls in the breading material being retained on the interior of the screen bottom 140 of the container 134. When the sifting operation has been completed, the closure plug 116 is inserted to close the opening 56 in the breading pan 48, and the reusable breading material is placed back into the breading pan 48 with any necessary additional breading material added thereto. The dough balls in the container 134 are removed for disposal. Once new batter dip material is placed in the batter pan 46, the operator can repeat the batter and breading procedure.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A table for coating food products with batter and breading comprising a support structure, a batter pan mounted on said support structure adapted to receive a quantity of batter material, a breading pan mounted on said support structure and adapted to receive breading material to enable food products to be coated with batter by dipping into batter material in said batter pan and breaded in breading material in said breading pan, a refrigeration system mounted on said support structure including a cooling coil in heat exchange relation to both of said pans to maintain the material in said pans at a temperature selected to retard bacteria growth, a water supply system mounted on said support structure and including a faucet in alignment with said batter pan, a water reservoir supplying water to said faucet, said refrigeration system including a cooling coil mounted in said water reservoir to chill water in the reservoir to a predetermined low temperature to supply chilled water to said faucet for discharge into said batter pan to form a chilled batter dip into which food products are dipped to coat with batter prior to breading in the breading pan.

2. The table as defined in claim 1, and further including a spray nozzle mounted on said support structure and connected to a water supply for rinsing and cleaning the pans.

3. The table as defined in claim 2, wherein said batter pan is provided with a drain line having a valve therein to drain batter from the batter pan, said valve being actuated by an actuator extending toward an external area of said table.

4. The table as defined in claim 1, wherein a motor driven pump transfers chilled water from the reservoir to the faucet aligned with the batter pan.

5. The table as defined in claim 4, wherein said reservoir includes a float valve to determine the level of water in said reservoir.

6. The table as defined in claim 5, wherein activation of said motor driven pump automatically closes a water inlet valve to said reservoir and automatically opens said inlet valve when the motor driven pump is stopped to enable the reservoir to be refilled.

7. A table for coating food products with batter and breading comprising a support structure, a batter pan mounted on said support structure adapted to receive a quantity of batter material, a breading pan mounted on said support structure and adapted to receive breading material to enable food products to be coated with batter by dipping into batter material in said batter pan and breaded in breading material in said breading pan, a refrigeration system mounted on said support structure including a cooling coil in heat exchange relation to both of said pans to maintain the material in said pans at a temperature selected to retard bacteria growth, and further comprising a sifter underlying said breading pan, a closeable discharge opening in said breading pan to discharge breading including any breading material that may have joined together to form dough balls into the sifter when the discharge opening is open, said sifter including a container having a bottom screened area and a movable agitator to discharge reusable breading material from the sifter through said screened area and retain dough balls in the sifter container for disposal.

8. The table as defined in claim 7, wherein said sifter is removably supported under the breading pan, said agitator being rotatably driven by a motor having a separable drive connection engaged externally of the sifter to drivingly connect the agitator with said motor when the sifter is placed in a position underlying the breading pan in alignment with the discharge opening in the breading pan and enabling separation of the driving connection when the sifter container is removed from under the breading pan.

9. A table for coating food products with batter and breading comprising a support structure, a batter pan mounted on said support structure adapted to receive a quantity of batter material, a breading pan mounted on said support structure and adapted to receive breading material to enable food products to be coated with batter by dipping into batter material in said batter pan and breaded in breading material in said breading pan, a refrigeration system mounted on said support structure including a cooling coil in heat exchange relation to both of said pans to maintain the material in said pans at a temperature selected to retard bacteria growth, wherein each of said pans is provided with an open top, and further including a removable closure member retaining the chilled condition of the batter dip material and breading material.

10. A table for coating food products with batter and breading comprising a support structure, a batter pan mounted on said support structure adapted to receive a quantity of batter material, a breading pan mounted on said support structure and adapted to receive breading material to enable food products to be coated with batter by dipping into batter material in said batter pan and breaded in breading material in said breading pan, a refrigeration system mounted on said support structure including a cooling coil in heat exchange relation to both of said pans to maintain the material in said pans at a temperature selected to retard bacteria growth, wherein said table includes a hood adjacent said pans for supporting a food product container.

11. A table for coating food products with batter and breading comprising a support structure, a batter pan mounted on said support structure adapted to receive a quantity of batter material, a breading pan mounted on said support structure and adapted to receive breading material to enable food products to be coated with batter by dipping into batter material in said batter pan and breaded in breading material in said breading pan, a refrigeration system mounted on said support structure including a cooling coil in heat exchange relation to both of said pans to maintain the material in said pans at a temperature selected to retard bacteria growth, and further including a perforated basket supported from an upper end of the batter pan for receiving food products for dipping into the batter material in the batter pan by lowering the basket into the batter material to immerse the food product in the batter material.

12. A food product processing table comprising a batter pan adapted to receive a quantity of batter material, a breading pan adapted to receive a quantity of breading material to enable food products to be sequentially coated with batter and breaded prior to cooking and a source of low temperature in heat exchange relation to said batter pan and batter material therein and to said breading pan and breading material therein to maintain said batter material and breading material at a temperature selected to retard bacteria growth in said materials, wherein said source of low temperature includes a refrigeration system including a refrigerant expansion cooling coil in heat exchange relation to each of said pans, wherein said table further comprises a water reservoir in communication with said batter pan, said refrigeration system including a refrigeration expansion cooling coil in said water reservoir to provide prechilled water to said batter pan to enable batter to be formed by using chilled water.

13. A breading and batter table comprising a table top and an enclosed cabinet underneath supporting said table top, a breading pan and a batter pan supported on said table top and extending into said enclosed cabinet through openings in said top, and a self-contained refrigerant system supported in said cabinet and in refrigerating communication with at least one of said breading pan and said batter pan.

14. The breading and batter table as defined in claim 13, wherein said refrigeration system includes a chilled water reservoir in communication with a dispenser to provide chilled water into the batter pan to enable batter dip to be formed in the batter pan.

15. The breading and batter table as defined in claim 14, wherein said chilled water reservoir includes a temperature monitoring probe and a heater to raise water temperature in said reservoir to actuate refrigeration cycle to maintain lower temperature in at least one of said batter pan and said breading pan.

* * * * *